US008280463B2

(12) United States Patent
Hori et al.

(10) Patent No.: US 8,280,463 B2
(45) Date of Patent: Oct. 2, 2012

(54) ELECTRONIC APPARATUS

(75) Inventors: Tetsuya Hori, Kawasaki (JP); Hiroshi Kobayashi, Kawasaki (JP); Toshiyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1098 days.

(21) Appl. No.: 12/184,012

(22) Filed: Jul. 31, 2008

(65) Prior Publication Data

US 2009/0082073 A1 Mar. 26, 2009

(30) Foreign Application Priority Data

Sep. 25, 2007 (JP) ................................. 2007-247787

(51) Int. Cl.
*H04M 1/00* (2006.01)
(52) U.S. Cl. ............... 455/575.3; 455/550.1; 455/575.1; 264/241; 361/736; 361/750
(58) Field of Classification Search ............... 455/575.1, 455/575.3, 550.1, 90.3, 575.8; 361/730, 361/736, 750, 748, 755, 724, 752; 264/239, 241

See application file for complete search history.

(56) References Cited

U.S. PATENT DOCUMENTS 6,166,912 A * 12/2000 Morii et al. .................... 361/737
2009/0039546 A1* 2/2009 Honma .......................... 264/241

FOREIGN PATENT DOCUMENTS

JP 09-058164 3/1997

* cited by examiner

*Primary Examiner* — Sujatha Sharma
(74) *Attorney, Agent, or Firm* — Staas & Halsey LLP

(57) ABSTRACT

An electronic apparatus includes a case, a cover member that includes a first layer, and a second layer made of a material different from that of the first layer, and an electronic component accommodated between the case and the cover member, wherein the second layer includes a first adhesion area that is adhered to the first layer, and a second adhesion area that is located closer to a center than the first adhesion area, adhered to the first layer, and recessed closer to the case than the first adhesion area, a step being formed between the first adhesion area and the second adhesion area.

7 Claims, 7 Drawing Sheets

ELECTRONIC APPARATUS

BACKGROUND OF THE INVENTION

1. Field of the Invention

The present invention relates to an electronic apparatus, and more particularly to a housing structure of an electronic apparatus. The present invention is suitable, for example, for a housing structure of a mobile radio communication phone, a personal digital assistant, and a portable game machine.

2. Description of the Related Art

Recently, a higher function and a lower profile are increasingly required for a cellular phone, and it is also important to maintain a housing strength and an electric characteristic of the cellular phone in addition to meeting these requirements. From the demand for the higher function, one proposed cellular phone has an arm that is configured to rotate relative to the fixing part, and a movable part that is mounted with the display and configured to rotate relative to the arm. A user can view the display in vertically orientation or in a lateral orientation by rotating the movable part. An arm accommodates an electronic component that is connected to a communication part, a display, and a fixing part.

On the other hand, from the demand for the lower profile demand, the housing of the cellular phone has increasingly been thinner, but the arm particularly needs to maintain a (bending) strength since a twisting force applies to the arm in rotating the movable part. While a cover member attached to a case of the conventional arm has a three-layer structure that consists of a resin layer, an adhesion layer, and a resin layer, it has been proposed to replace the outermost resin layer with a metal (or Al) layer, because the metal layer is stronger than the resin layer.

Prior art includes Japanese Patent Laid-Open No. ("JP") 09-58164.

In the cover member of the arm that consists of the metal layer, the adhesion layer, and the resin layer, each of the metal layer and the resin layer has a U-shaped section made of a flat part that is bent at both sides, and the adhesion layer is made of a double-sided tape. While the size of the resin layer is precisely formed through injection molding, it is difficult to precisely form the metal layer having a fine curved surface. In addition, the metal layer and the resin layer have a different coefficient of thermal expansion. Hence, when the metal layer is adhered to the resin layer via the adhesion layer, the flat part of the metal layer is stretched by the flat part of the resin layer, and a warp occurs at the edge of the U-shaped section of the cover member due to a manufacturing size error and the different coefficient of thermal expansion of both members, causing the end of the metal layer to float over the resin layer. As a result, a slight gap occurs between the end of the metal layer and the resin layer. When the resin layer is provided with a perforation hole to expose part of the electronic component in order to realize a lower profile configuration, foreign particles enter the perforation hole and may deteriorate the electric characteristic through short circuiting of the electric circuit.

SUMMARY OF THE INVENTION

The present invention is directed to an electronic apparatus that lowers the influence of a gap of an end of a cover member that contains two layers made of different materials.

An electronic apparatus according to one aspect of the present invention includes a case, a cover member that includes a first layer, and a second layer made of a material different from that of the first layer, and an electronic component accommodated between the case and the cover member, wherein the second layer includes a first adhesion area that is adhered to the first layer, and a second adhesion area that is located closer to a center than the first adhesion area, adhered to the first layer, and recessed closer to the case than the first adhesion area, a step being formed between the first adhesion area and the second adhesion area. This electronic apparatus spreads a gap between the first layer and the second layer on the second adhesion area, and lowers a deformation force applied to the center part of the first layer above the second adhesion area. As a result, this configuration reduces a deformation force that transmits to the end of the first layer, and prevents a spread of a gap between the second layer and the end of the first layer.

An electronic apparatus according to another aspect of the present invention includes a case, a cover member that includes a first layer, and a second layer made of a material different from that of the first layer, and an electronic component accommodated between the case and the cover member, wherein the second layer includes a first adhesion area that is adhered to the first layer, and a second adhesion area that is located closer to a center than the first adhesion area, adhered to the first layer, and thinner than the first adhesion area. This electronic apparatus lowers the rigidity of the second layer in the second adhesion layer, and lowers a deformation force applied to the center part of the first layer above the second adhesion area. As a result, this configuration reduces a deformation force that transmits to the end of the first layer, and prevents a spread of a gap between the second layer and the end of the first layer.

For example, the second layer may have a perforation hole that exposes the electronic component. Since the perforation hole lowers the adhesion area, it lowers a deformation force applied to the center part of the first layer lowers to some extent. As a result, this configuration reduces a deformation force that transmits to the end of the first layer, and prevents a spread of a gap between the second layer and the end of the first layer.

For example, the first layer is a metal layer, and the second layer is a resin layer. The resin layer can be formed with good size precision through injection molding, whereas it is difficult to form the metal layer with good size precision. In addition, both members have different coefficients of thermal expansion, and thus a gap between the first layer and the end of the second layer is likely to spread. Thus, the present invention is particularly useful when a size error occurs between two different types of layers. In addition, the present invention is particularly useful when the metal layer has a large radius of curvature (or a large curvature) at the end.

The electronic apparatus may further include a fixing part that includes an input part 111 and a microphone, an arm that is configured to rotate relative to the fixing part, a hinge member that connects the arm to the fixing part so that the arm can be folded over and unfolded from the fixing part, and a movable part that includes a display and is configured to rotate relative to the arm, the arm includes the case and the cover member. A bending stress is applied to the arm when the movable part is rotated, and the arm can use a lamination structure of a metal layer and a resin layer. Thus, as discussed above, a gap between the first layer and the second layer is likely to spread.

The second layer may have a curvature of an area opposite to an end of the first layer greater than that of the end (or a radius curvature of an area opposite to an end of the first layer smaller than that of the end). Even if the end of the first layer is formed to have a curvature larger than a given curvature (or a radius of curvature smaller than a given radius of curvature), the interference between the end of the first layer and the second layer can be prevented. This configuration prevents a float of the end of the first layer, and a spread of a gap between the end of the first layer and the second layer.

The second layer may have at least part of the area, and includes a pocket part that has a pocket into which at least a tip of the end of the first layer is inserted. By inserting at least the tip of the end of the first layer into the pocket, a gap between the first layer and the end of the second layer is shielded from the foreign matters and the influence of the foreign matters can be lowered.

Further features of the present invention will become apparent from the following description of exemplary embodiments (with reference to the attached drawings).

DESCRIPTION OF THE EMBODIMENTS

Referring now to the accompanying drawings, a description will be given of a cellular phone 100 as one example of an electronic apparatus according to the present invention. The cellular phone is one example of a mobile radio communication apparatus, which generalizes a cellular phone, a personal digital cellular ("PDC"), a personal handy phone ("PHS"), and another mobile communication terminal in this embodiment.

Figure 1:
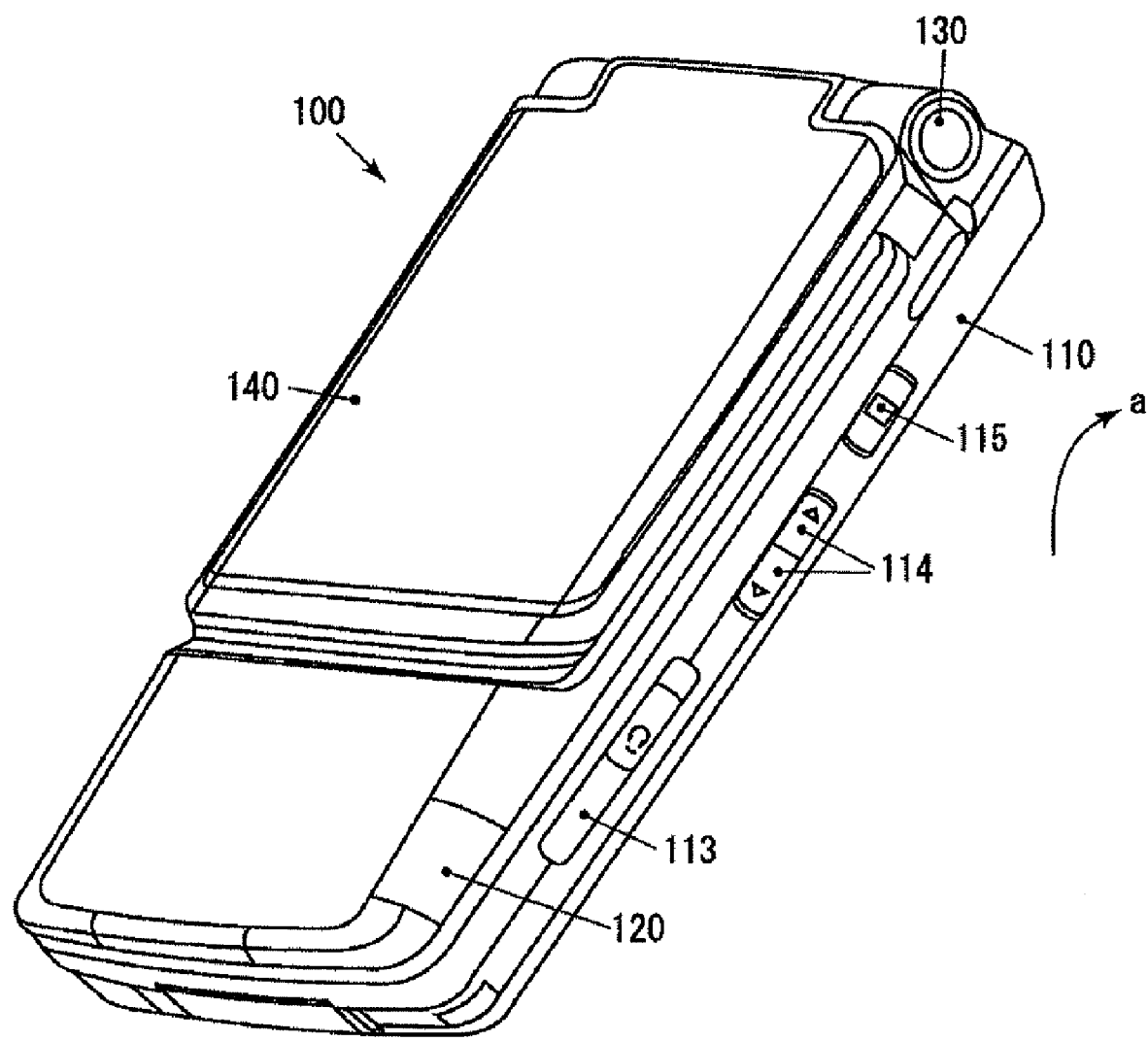
FIG. 1 is a perspective overview of a cellular phone according to one embodiment of the present invention.
Figure 2:
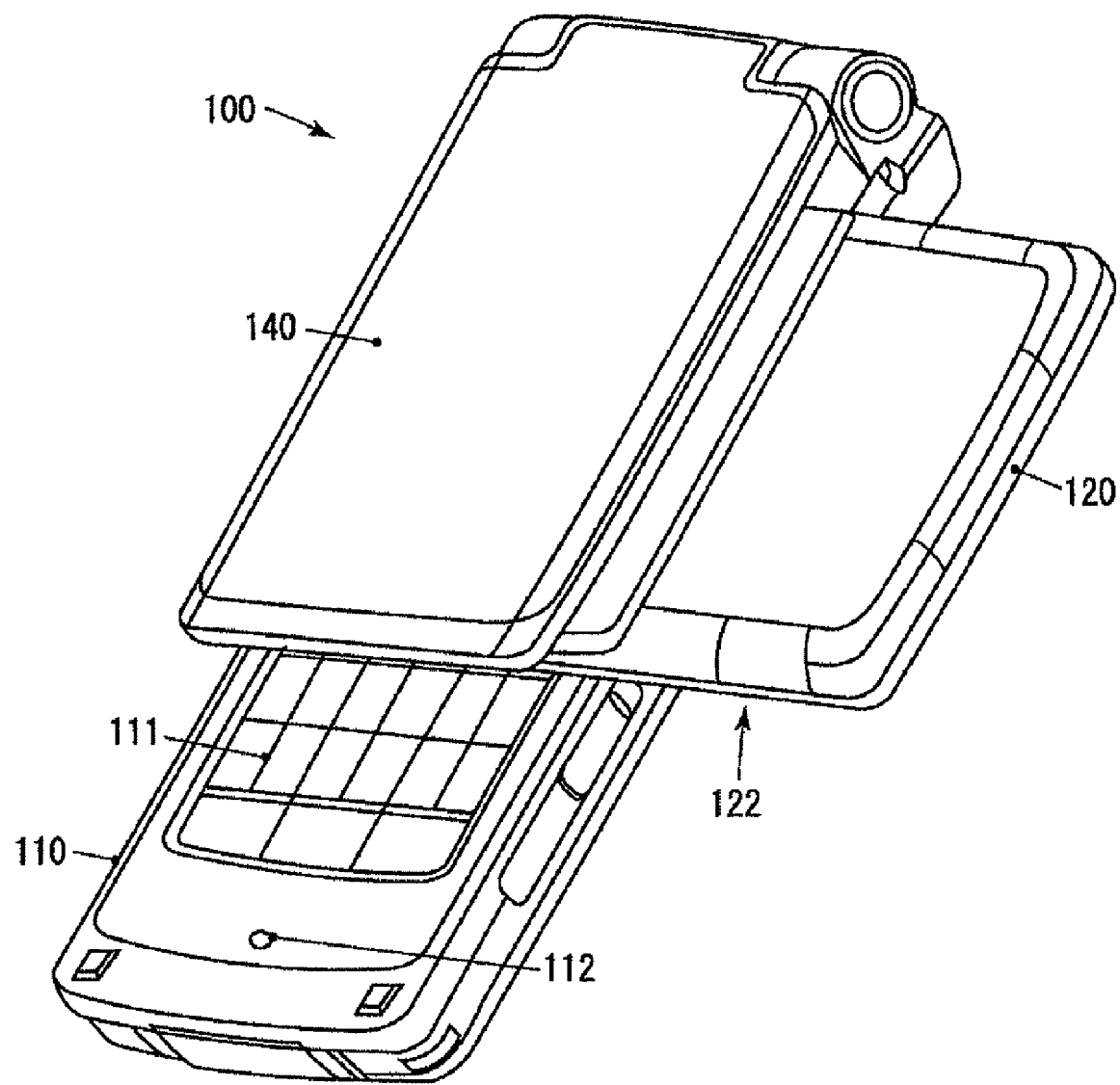
FIG. 2 is a perspective overview of the cellular phone shown in FIG. 1 in which a movable part is rotated by 90°.
Figure 3:
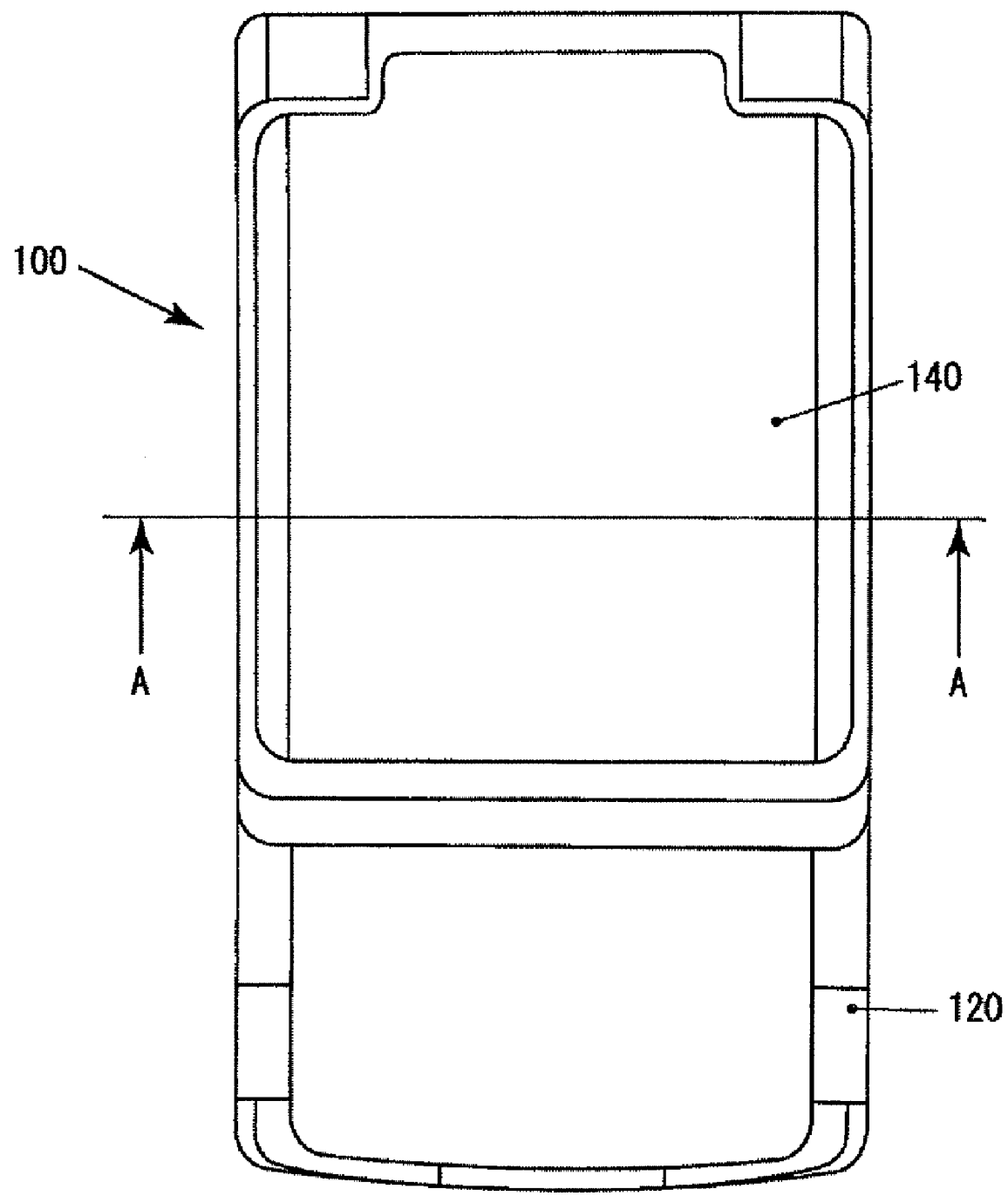
FIG. 3 is a plane view of the movable part and an arm the cellular phone shown in FIG. 1.
Figure 4:
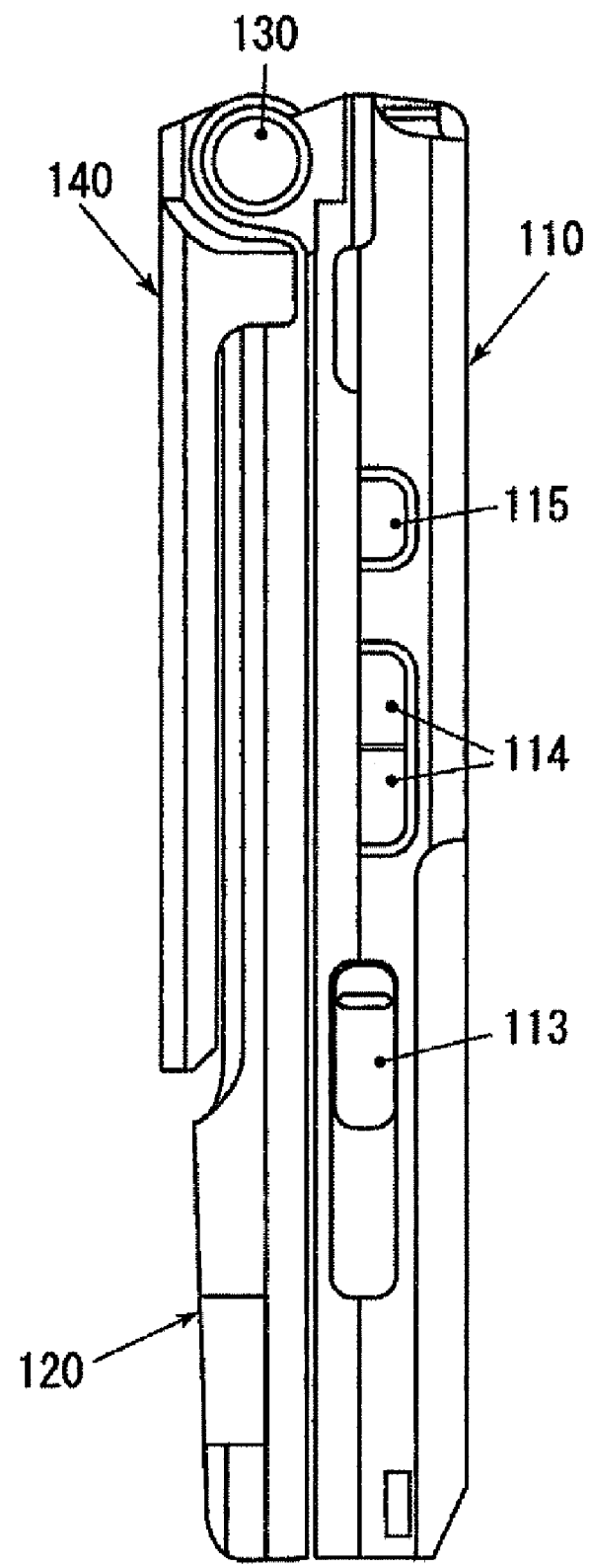
FIG. 4 is a side view of the cellular phone show in FIG. 1.

FIG. 1 is a perspective overview of the cellular phone 100. FIG. 2 is a perspective overview of the cellular phone 100 in which a movable part 120 is rotated by 90°. FIG. 3 is a plane view of the movable part 120 and an arm 140 of the cellular phone 100. FIG. 4 is a side view of the cellular phone 100.

The cellular phone 100 is a foldable cellular phone in which the arm 140 is combined with the fixing part 110 so that the arm 140 can be folded over the fixing part 110 via the hinge part 130. A user can fold the arm 140 over the fixing part 110 as shown in FIG. 1 when he does not use the cellular phone 100, and a user can unfold the arm 140 from the fixing part 110 by rotating the arm 140 in the "a" direction in FIG. 1 before he uses the cellular phone 100.

The fixing part 110 has a housing structure that combines a front case with a rear case, and both cases are made, for example, of ABS resin through injection molding and combined with each other by screws. The fixing part 110 includes an input part that includes a track ball (not shown) and a ten-key (not shown) through which the user inputs communication information, a microphone 112, a slide type earphone cap 113, a battery (not shown), a printed board (not shown), volume buttons 114, and a music key 115.

The movable part 120 has a housing structure that combines a front case with a rear case, and both cases are made, for example, of ABS resin through injection molding and combined with each other by screws. The movable part 120 includes a display 122 and a speaker (not shown). The display 122 includes an LCD module that displays communication information, such as transmission information, reception information, address book information, information input from the input part 111, and various types of function information. The speaker outputs a voice of a communicatee. The movable part 120 is configured to rotate relative to the arm 140, as shown in FIGS. 1 and 2. Since the rotation mechanism for the movable part 120 is known as in F904i sold by this assignee, an illustration and a detailed description will be omitted.

The hinge part 130 connects the arm 140 to the fixing part 110 so that the arm 140 can be folded over and unfolded from the fixing part 110.

Figure 5:
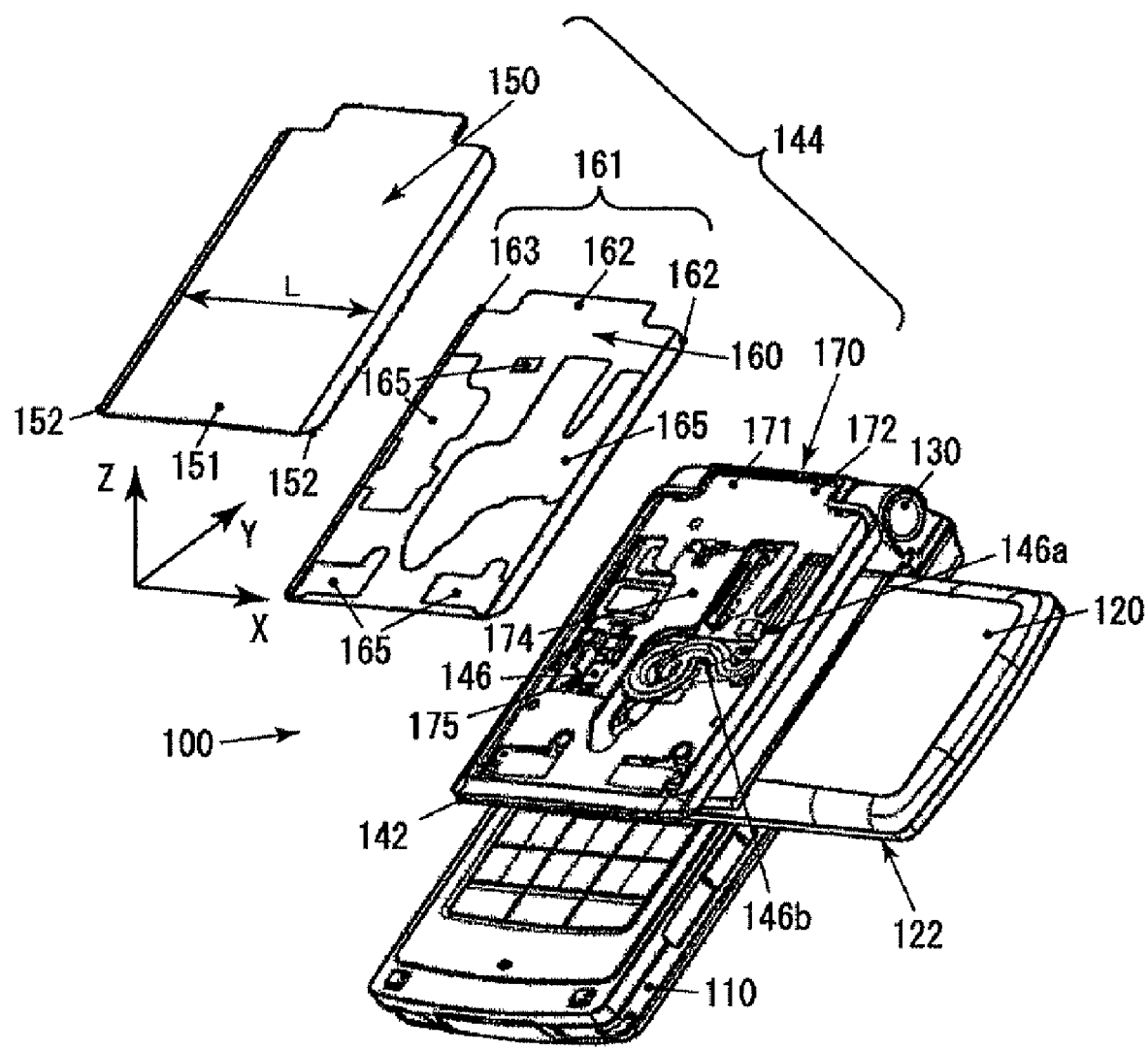
FIG. 5 is an exploded perspective view of the arm shown in FIG. 2.

FIG. 5 is an exploded perspective view of the arm 140. The arm 140 includes a case 142 arranged at a lower side, and a cover member 144 that covers the case 142.

An electronic component 146 is accommodated between the case 142 and the cover member 144. The electronic component 146 includes a printed board 146a, a cable 146b, and another electronic component. The printed board 146a is connected to the display 122 of the movable part 120 and the speaker via the cable 146b. The printed board 146a processes information displayed on the display 122 and information output from the speaker, and communicates with a printed board of the fixing part via a flexible printed board ("FPC") (not shown).

The case 142 is made, for example, of ABS resin through injection molding.

Figure 6:
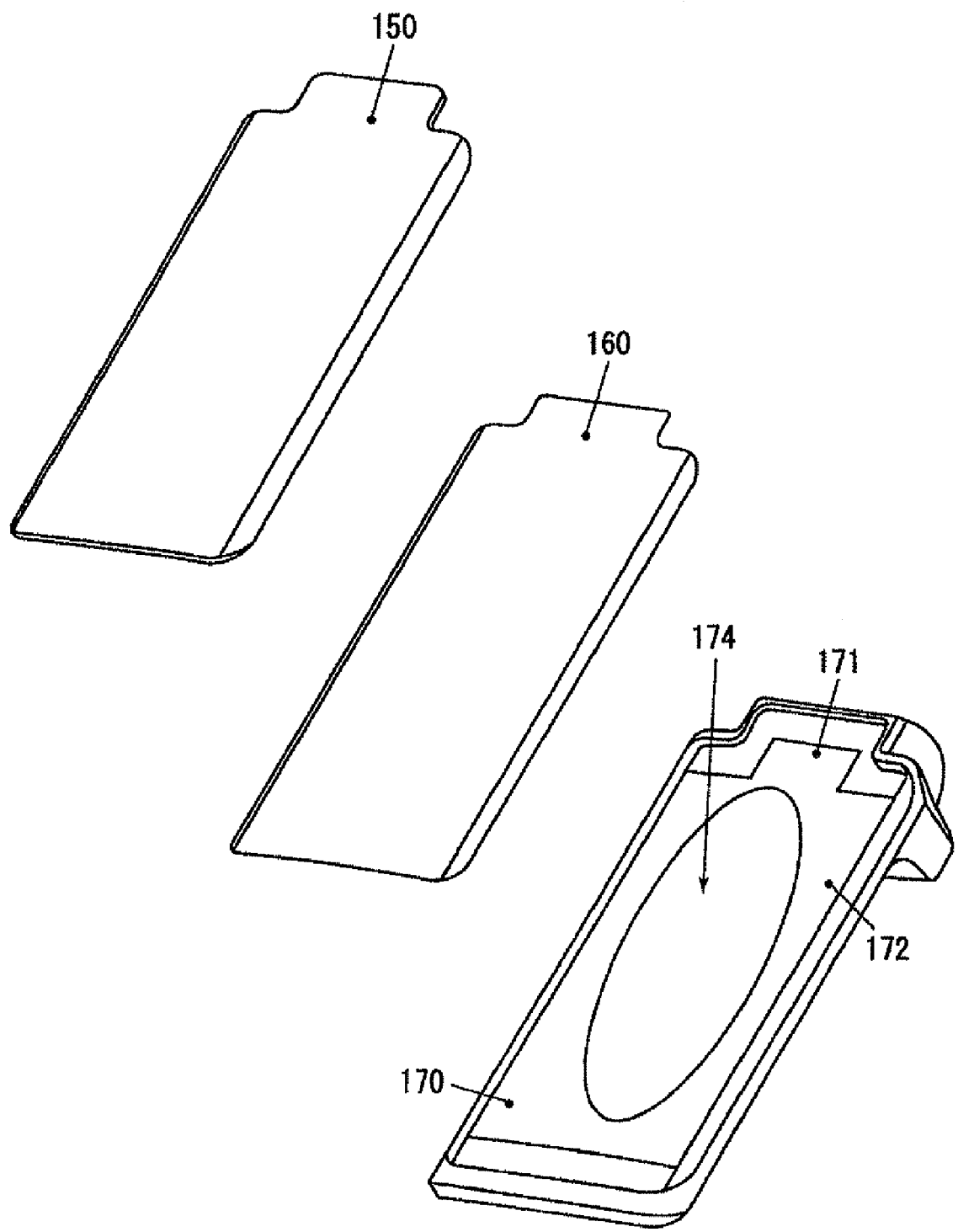
FIG. 6 is a schematic perspective view of the cover member shown in FIG. 5.
Figure 7:
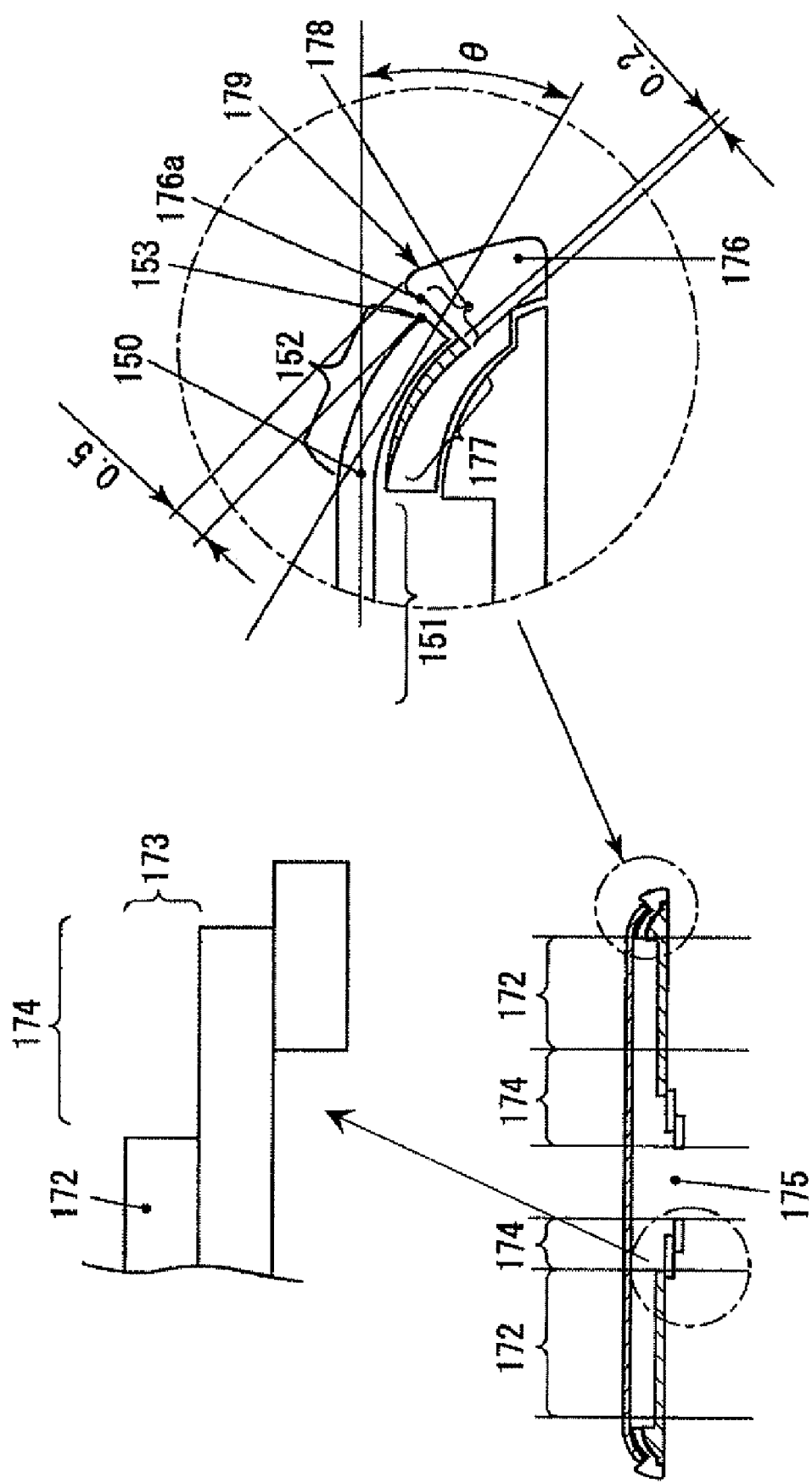
FIG. 7 is a sectional view taken along a line A-A shown in FIG. 3.

The cover member 144 has a three-layer structure that consists of a metal panel (metal layer or first layer) 150, a double-sided tape (adhesion layer) 160, and a resin case (resin layer or second layer) 170, and the resin case 170 is screwed or fixed by the case 142. FIG. 6 is a schematic perspective view of the cover member 144. FIG. 7 is a sectional view taken along a line AA in FIG. 3, but omits the double-sided tape 160.

The metal panel 150 is made of aluminum, and serves as an outermost layer in the cover member. A bending stress is applied to the arm 140 when the movable part 120 is rotated, and thus the arm 140 uses the strong metal panel 150.

The metal panel 150 includes, as shown in FIG. 7, a center part 151, and a pair of ends 152 formed at both sides of the center part 151. The center part 151 has a width L (or length in the X direction of FIG. 5), and is approximately flat with an extremely large radius of curvature on the XZ plane (or therefore extremely small curvature) in this embodiment. Of course, the present invention is applicable to a completely flat center part 151. Each end 152 has a smaller radius of curvature (or a larger curvature) than the center part 151, and an inclination angle θ is smaller than 90° (such as several degrees to about 45°) relative to the center part 151 at the tip of the end 152. The present invention is particularly useful for a small inclination (or curvature) of the end 152, because the size of the metal panel 150 cannot be precisely formed in that case.

The double-sided tape 160 bonds the metal panel 150 to the resin case 170. The double-sided tape 160 includes, as shown in FIG. 5, an adhesion part 161 and perforation holes 165. The adhesion part 161 is shaped similar to the metal panel 150, includes a center part 162 and a pair of ends 163 at both ends of the center part 162. A width (or length in the X direction) of the center part 162 is slightly smaller than L. The perforation holes 165 are formed at parts corresponding to the perforation holes 175 in the resin case 170, and the number of perforation holes 165 is not limited. If the resin case 170 has no perforation hole 175, no perforation hole 165 may not be formed. The perforation hole 165 may be slightly larger than the perforation hole 175. The adhesion layer may use adhesive instead of the double-sided tape 160.

The resin case 170 is a molded article made of resin through injection molding. Thus, the resin case 170 is made of a material different from that of the metal panel 150, and arranged inside of the metal panel 150. The resin case 170 can be formed with good size precision through injection molding, whereas it is difficult to form the metal panel 150 with good size precision. In addition, since both members have different coefficients of thermal expansion, a gap between the metal panel 150 and the end of the resin case 170 is likely to spread. The metal layer is particularly suitable for an end having a large radius of curvature (or a small curvature).

The resin case 170 has a first adhesion area 172, a second adhesion area 174, and perforation holes 175 in a recess 171 formed lower than the edge. The recess 171 is approximately flat and lowers a deformation force that would otherwise occur in the adhesion between the metal panel 150 and the resin case 170. A width (or distance in the X direction) of the recess 171 is slightly shorter than L.

The first adhesion area 172 is provided around the recess 171, and bonded with the metal panel (first layer) 150, as shown in FIGS. 6 and 7. The second adhesion area 174 is located at the center of the recess 171 or closer to the center than the first adhesion area 172, as shown in FIGS. 6 and 7. The second adhesion area 174 is bonded with the metal panel (first layer) 150, and a step 173 is formed between the first adhesion area 172 and the second adhesion area 174. The second adhesion area 174 is recessed on the side of the case 142 from the first adhesion area 172 when viewed from the metal panel (first layer) 150. The step 173 is, for example, 0.2 mm. This configuration weakens an adhesion force by spreading a gap between the metal panel 150 and the resin case 170 in the second adhesion area 174, and thus lowers a deformation force applied to the center part 151 of the metal panel 150 on the second adhesion area 174. As a result, this configuration lowers a deformation force that transmits to the end 152 of the metal panel 150, and prevents a spread of a gap between the end 152 of the metal panel 150 and the resin case 170.

The second adhesion area 174 is thinner than the first adhesion area 172. For example, the first adhesion area 172 has a thickness of 0.6 mm, and the second adhesion area 174 has a thickness of 0.4 mm. This embodiment sets the thickness of the second adhesion area 174 to the lowest value of a moldable thickness. Thereby, since the rigidity of the resin case 170 lowers in the second adhesion area 174, a deformation force applied to the central part 151 of the metal panel 150 reduces above the second adhesion area 174. In other words, the curvature of the central part 151 of the metal panel 150 is likely to maintain on the second adhesion area 174. As a result, this configuration reduces a deformation force that transmits to the end 152 of the metal panel 150, preventing a spread of a gap between the resin case 170 and the end 152 of the metal panel 150. While this embodiment forms the second adhesion area 174 at a location lower than the first adhesion area 172, the second adhesion area 174 may be formed on the same plane as the first adhesion area when the rigidity is weakened through control over a thickness and a material.

The perforation hole 175 exposes part of the electronic component 146. Since the perforation hole 175 reduces the adhesion area, it can reduce a deformation force applied to the metal panel 150 to some extent and a deformation force that transmits to the end of the metal panel 150, preventing a spread of a gap between the resin case 170 and the end 152 of the metal panel 150. However, it should be noted that when the perforation hole 175 has an excessively large area, the adhesion force by which the metal panel 150 is adhered to the resin case 170 becomes too weak, and the metal panel 150 is likely to separate from the resin case 170 on external impact.

The resin case 170 has, as shown in FIG. 7, a pocket part 176 at the edge. The pocket part 176 includes an area 177, a bottom 178, and a projection 179, and the bottom 178 and the projection 179 and at least part of the area 177 form a pocket 176a into which at least the tip 153 of the end 152 of the metal panel 150 is inserted.

The area 177 opposes the end 152 of the metal panel 150, and has a curvature larger than that of the end 152 of the metal panel 150 (or a radius of curvature smaller than that of the end 152 of the metal panel 150). The top surface of the hatched part in FIG. 7 is the same as the curvature of the end of the metal panel 150, and this hatched part is removed from the pocket part 176. A thickness of the hatched part near the tip 153 of the metal panel 150 is 0.2 mm in this embodiment. Thereby, even if the end 152 of the metal panel 150 is formed to have a curvature larger than a given curvature (or a radius of curvature smaller than a given radius of curvature), the interference between the end 152 of the metal panel 150 and the area 177 of the resin case 170 can be prevented. As a result, this configuration prevents a float of the end 152 of the metal panel 150, and a spread of a gap between the end 152 of the metal panel 150 and the area 177 of the resin case 170.

By inserting the pocket 176a into at least tip 153 of the end 152 of the metal panel 150, the projection 179 shields from foreign matters a gap between the end 152 of the metal panel 150 and the resin 170, reducing the influence of the foreign matters.

The bottom 178 has a length much larger than the thickness of the metal panel 150. Even when the end 152 of the metal panel 150 is formed with a given curvature in FIG. 7, there is a length of 0.5 mm to the outer side of the projection 179. Therefore, even when the end 152 of the metal panel 150 is formed with a curvature smaller than the given curvature (or with a radius of curvature larger than the given radius of curvature), the interference between the end 152 of the metal panel 150 and the projection 179 can be prevented. Thus, the pocket 176a can absorb a shaping error of the metal panel 150.

In operation, at the use time, the user unfolds the arm 140 from the fixing part 110 by utilizing the hinge part 130, and rotates the movable part 120 relative to the arm 140 when the user would like to view the display 122 in a lateral orientation. In this case, a bending stress applies, but the metal panel 150 of the cover member 144 of the arm 140 bears the bending stress. On the other hand, even if there is a manufacturing error and thermal deformation of the metal panel 150, the center part 151 is not strongly adhered to the second adhesion area 174 of the recess 171 of the resin case 170, and the rigidity of the second adhesion area 174 is low. Therefore, the end 152 is not subject to a strong deformation. As a result, this configuration can prevent a spread of a gap between the tip 153 of the edge 152 of the metal panel 150 and the resin case 170, and avoid a deterioration of an electric characteristic due to intrusions of foreign matters through the gap. In addition, the pocket 176a absorbs the shaping error of the metal panel 150, and the projection 179 shields the foreign matters from the outside, consequently preventing a deterioration of the electric characteristic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-2477787, filed Sep. 25, 2007, which is hereby incorporated by reference herein in its entirety.

What is claimed is:

1. An electronic apparatus comprising:
   a case;
   a cover member that includes a first layer, and a second layer made of a material different from that of the first layer; and
   an electronic component accommodated between the case and the cover member,
   wherein the second layer includes:
   a first adhesion area that is adhered to the first layer; and
   a second adhesion area that is located closer to a center than the first adhesion area, adhered to the first layer, and recessed closer to the case than the first adhesion area, a step being formed between the first adhesion area and the second adhesion area.

2. An electronic apparatus comprising:
   a case;
   a cover member that includes a first layer, and a second layer made of a material different from that of the first layer; and
   an electronic component accommodated between the case and the cover member,
   wherein the second layer includes:
   a first adhesion area that is adhered to the first layer; and
   a second adhesion area that is located closer to a center than the first adhesion area, adhered to the first layer, and thinner than the first adhesion area.

3. The electronic apparatus according to claim 1, wherein the second layer has a perforation hole that exposes the electronic component.

4. The electronic apparatus according to claim 1, wherein the first layer is a metal layer, and the second layer is a resin layer.

5. The electronic apparatus according to claim 1, further comprising:
   a fixing part that includes an input part and a microphone;
   an arm that is configured to rotate relative to the fixing part;
   a hinge member that connects the arm to the fixing part so that the arm can be folded over and unfolded from the fixing part; and
   a movable part that includes a display and is configured to rotate relative to the arm, the arm includes the case and the cover member.

6. The electronic apparatus according to claim 1, wherein the second layer has a curvature of an area opposite to an end of the first layer greater than that of the end.

7. The electronic apparatus according to claim 6, wherein the second layer has at least part of the area, and includes a pocket part that has a pocket into which at least a tip of the end of the first layer is inserted.

* * * * *